(12) United States Patent
Fischer (10) Patent No.: US 12,179,700 B2
(45) Date of Patent: Dec. 31, 2024

(54) METHOD OF PROXIMITY DETECTION BETWEEN TWO DEVICES

(71) Applicant: Nagravision Sàrl, Cheseaux-sur-Lausanne (CH)

(72) Inventor: Jean-Bernard Fischer, Cheseaux-sur-Lausanne (CH)

(73) Assignee: Nagravision Sàrl, Cheseaux-sur-Lausanne (CH)

( * ) Notice: Subject to any disclaimer, the term of this patent is extended or adjusted under 35 U.S.C. 154(b) by 338 days.

(21) Appl. No.: 17/655,834

(22) Filed: Mar. 22, 2022

(65) Prior Publication Data

US 2022/0297636 A1    Sep. 22, 2022

(30) Foreign Application Priority Data

Mar. 22, 2021    (EP) .................................... 21164091

(51) Int. Cl.
| | |
|---|---|
| *H04W 4/23* | (2018.01) |
| *B60R 25/24* | (2013.01) |
| *B60R 25/30* | (2013.01) |
| *H04W 4/02* | (2018.01) |
| *H04W 76/10* | (2018.01) |

(52) U.S. Cl.
CPC .............. *B60R 25/30* (2013.01); *B60R 25/24* (2013.01); *H04W 4/023* (2013.01); *B60R 2325/101* (2013.01); *B60R 2325/106* (2013.01); *B60R 2325/205* (2013.01); *H04W 76/10* (2018.02)

(58) Field of Classification Search
CPC .............................. H04W 4/023; H04W 76/10
USPC ....................................................... 455/456.1
See application file for complete search history.

(56) References Cited

U.S. PATENT DOCUMENTS

| | | |
|---|---|---|
| 10,427,643 B1 | 10/2019 | Casamassima et al. |
| 2013/0116964 A1 | 5/2013 | Van Roermund et al. |
| 2018/0099643 A1 | 4/2018 | Golsch et al. |
| 2019/0263356 A1 | 8/2019 | Golsch et al. |
| 2020/0247363 A1 | 8/2020 | Golsch et al. |

(Continued)

FOREIGN PATENT DOCUMENTS

| | | | |
|---|---|---|---|
| EP | 3 594 913 A3 | 1/2020 | |
| EP | 3594913 A2 * | 1/2020 | ............. B60R 25/24 |

(Continued)

OTHER PUBLICATIONS

Extended European Search Report issued Sep. 3, 2021 in European Application 21 164 091.7 filed on Mar. 22, 2021, 7 pages (with Written Opinion).

*Primary Examiner* — Rasha S Al Aubaidi
*Assistant Examiner* — Jirapon Tulop
(74) *Attorney, Agent, or Firm* — Oblon, McClelland, Maier & Neustadt, L.L.P.

(57) ABSTRACT

The method of proximity detection between a first and a second device (DVC1, DVC2), carried out by the first device (DVC1), comprises the steps of collecting a first information on exposure of the first device (DVC1) to electromagnetic waves; receiving a second information on exposure of the second device (DVC2) to electromagnetic waves from the second device (DVC2); determining a matching information between the first information on exposure and the second information on exposure and detecting either proximity or non-proximity between the first and the second device (DVC1, DVC2) based on the matching information.

13 Claims, 3 Drawing Sheets

(56) References Cited

U.S. PATENT DOCUMENTS

2021/0245707 A1    8/2021  Golsch et al.
2022/0377285 A1*  11/2022  Hallett .................. H04W 4/023

FOREIGN PATENT DOCUMENTS

WO    WO 2018/071671 A2    4/2018
WO    WO 2018/071671 A3    4/2018

* cited by examiner

METHOD OF PROXIMITY DETECTION BETWEEN TWO DEVICES

TECHNICAL FIELD

The present disclosure relates to the field of proximity detection between two devices. The proximity detection can be used for example in a vehicle to automatically unlock the vehicle with a smartphone, when the smartphone approaches the vehicle.

BACKGROUND

Some vehicles, typically cars, can be locked and unlocked without key, with a smartphone having an application of car key. For example, lock and unlock buttons on a main screen of the smartphone allow a user to quickly lock and unlock the car from a smartphone application. Such an application can also implement a function of proximity lock/unlock. In that case, the car is configured to sense the smartphone and automatically unlock when the smartphone approaches the car, and to automatically lock the car when the smartphone moves away.

Such applications of car proximity lock/unlock suffer a security breach. Indeed, the car access can be hacked by a relay attack to unlock the car. In a relay attack, a first attacker is located close to the car and a second attacker is located close to the user smartphone. A communication between the car and the smartphone can be initiated by one of the two attackers. For example, the first attacker approaches the car with a device that simulates a smartphone having a proximity lock/unlock application. Then, the car responds by initiating an exchange of messages. The two attackers merely relay the messages between the car and the smartphone, without manipulating or even reading them, until the car recognizes the smartphone and unlocks. For security reason, the messages between the car and the smartphone are generally encrypted.

Therefore, there is a need for ensuring that the car and the smartphone are in proximity to each other before unlocking the car. More generally, there is a need for ensuring that two devices are in proximity to each other in a robust manner in case of a relay attack to hack one of two devices.

SUMMARY

The present disclosure concerns a method of proximity detection between a first and a second device, carried out by the first device, comprising the steps of:
collecting a first information on exposure of the first device to electromagnetic waves;
receiving a second information on exposure of the second device to electromagnetic waves from the second device;
determining a matching information between the first information on exposure and the second information on exposure and
detecting either proximity or non-proximity between the first and the second device based on the matching information.

The electromagnetic waves refer to waves of the electromagnetic field propagating or radiating through space or over-the-air. In an embodiment, they only include radio waves. In other embodiments, the electromagnetic waves may include any other type of electromagnetic radiations such as microwaves, infrared, ultraviolet, (visible) light, X-rays and/or gamma rays.

In order to ensure that both devices, for example a car and a smartphone, are in proximity to each other (in other words: close), the first device collects a first information on what the first device "sees" in its electromagnetic wave spectrum (for example, in its radio spectrum), and receives a second information on what the second device "sees" in its electromagnetic wave spectrum (for example, in its radio spectrum). Generally, each of the first and second device can receive Wi-Fi, Bluetooth and cellular radio signals from different sources of electromagnetic waves (such as radio signals). Thus, each device generates a fingerprint (in other words: an image) of its electromagnetic wave environment, corresponding to the first information on exposure and the second information on exposure. Typically, the fingerprint of each device includes a list of sources of electromagnetic waves exposing said device. Then, the two fingerprints, or images, are compared to determine a matching information (in other words: a similarity information). A certain range of tolerance between the two fingerprints can be allowed because the wireless reception at each device depends on many parameters (the antenna efficiency, how the antenna is oriented, etc.). The matching or similarity information provides a level of confidence to evaluate whether or not the two devices are in proximity to each other. For example, if both devices see the same strongest sources of electromagnetic waves, it can be determined that they are close to each other. If the strongest sources seen by the first device are different from the strongest sources seen by the second device, it is highly probable that both devices are not located in proximity to each other. The proximity detection is based on the fact that if both devices see the same sources of electromagnetic waves, it means that they are close to each other. Such a proximity detection is very robust to relay attacks and can be performed in various environments. The noisier the electromagnetic wave environment, the better such a method of proximity detection works.

In some embodiments, the first device calculates a matching score between the first information on exposure and the second information on exposure and, in case that the matching score is more than a predetermined threshold, detects proximity between the first and second device.

The first device can perform the further steps of:
collecting a first list of sources of electromagnetic waves exposing the first device;
receiving a second list of sources of electromagnetic waves exposing the second device;
determining a consistency information between the two lists; and
using said consistency information to determine the matching information.

Said consistency information can be limited to the N strongest sources exposing the first device and to the N strongest sources exposing the second device, N being a predetermined and fixed number.

Optionally, the first device:
further measures first exposure level values, each first exposure level value corresponding to a level of exposure of the first device to each of the corresponding sources of electromagnetic waves;
receives second exposure level values, each second exposure level value corresponding to a level of exposure of the second device to each of the corresponding sources of electromagnetic waves and being included in the second information on exposure; and
uses the first exposure level values and the second exposure level values in the determination of the matching information.

Each of the first and second device can collect information on exposure of said device to electromagnetic waves from sources of the group including Wi-Fi sources, Bluetooth sources, a cellular network device and connected devices.

Advantageously, the first device establishes a secure communication with the second device and receives the second information on exposure from the second device via the secure communication.

The method can further comprise a step of automatically executing a predefined action, at the first device, upon detection of proximity between the first and second device. The predefined action consists for example in automatically unlocking the first device.

For example, the first device is a vehicle and the second device is a mobile user equipment, such as a smartphone, a mobile phone, a tablet or a laptop.

The present disclosure further concerns a first device comprising
a collector configured to collect a first information on exposure of the first device to electromagnetic waves;
a communication module configured to establish a communication with a second device;
characterized in that
the communication module is further configured to receive a second information on exposure of the second device to electromagnetic waves, via the established communication; and the first device further comprises a proximity detection module configured to determine a matching information between the first information on exposure and the second information on exposure and detect either proximity or non-proximity between the first and the second device depending on the matching information.

In some embodiments, the collector is configured to collect a first list of sources of electromagnetic waves exposing the first device;
the communication module is configured to receive a second list of sources of electromagnetic waves exposing the second device; and
the proximity detection module is further configured to determine a consistency information between the two lists and to use said consistency information to determine the matching information.

The first device can comprise at least one measuring instrument to measure first exposure level values, each first exposure level value corresponding to a level of exposure of the first device to each of the corresponding sources of electromagnetic waves;
wherein the communication module is configured to receive second exposure level values, each second exposure level value corresponding to a level of exposure of the second device to each of the corresponding sources of electromagnetic waves;
and wherein the proximity detection module is further configured to use the first exposure level values and the second exposure level values in the determination of the matching information.

The present disclosure also concerns a second device comprising:
a collector configured to collect a second information on exposure of the second device to electromagnetic waves;
a communication module configured to establish a communication with a first device;
characterized in that
the communication module is further configured to transmit the second information on exposure, via the established communication.

The present disclosure also concerns a computer program comprising instructions which, when executed by a first computer, cause the first computer to execute the method steps previously defined.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

The present disclosure concerns proximity detection between two devices DVC1, DVC2. There are many situations in which a proximity detection between two devices DVC1, DVC2 needs to be performed. At least one of the two devices, termed as second device, can be a mobile device that is likely to approach the other device, termed as first device. In case of a positive detection of proximity, a predefined action can be automatically executed by one of the two devices DVC1, DVC2, or by both devices DVC1, DVC2. For example, an access to the first device DVC1 is authorized and/or the first device DVC1 is unlocked. The mobile device can be a mobile phone, a smartphone, a tablet, a laptop, or any other mobile user equipment. The first device DVC1 is for example a vehicle, a computer, a door opening and closing system, or any other device that is likely to execute a predefined action when it senses a second device in its proximity.

Figure 4:
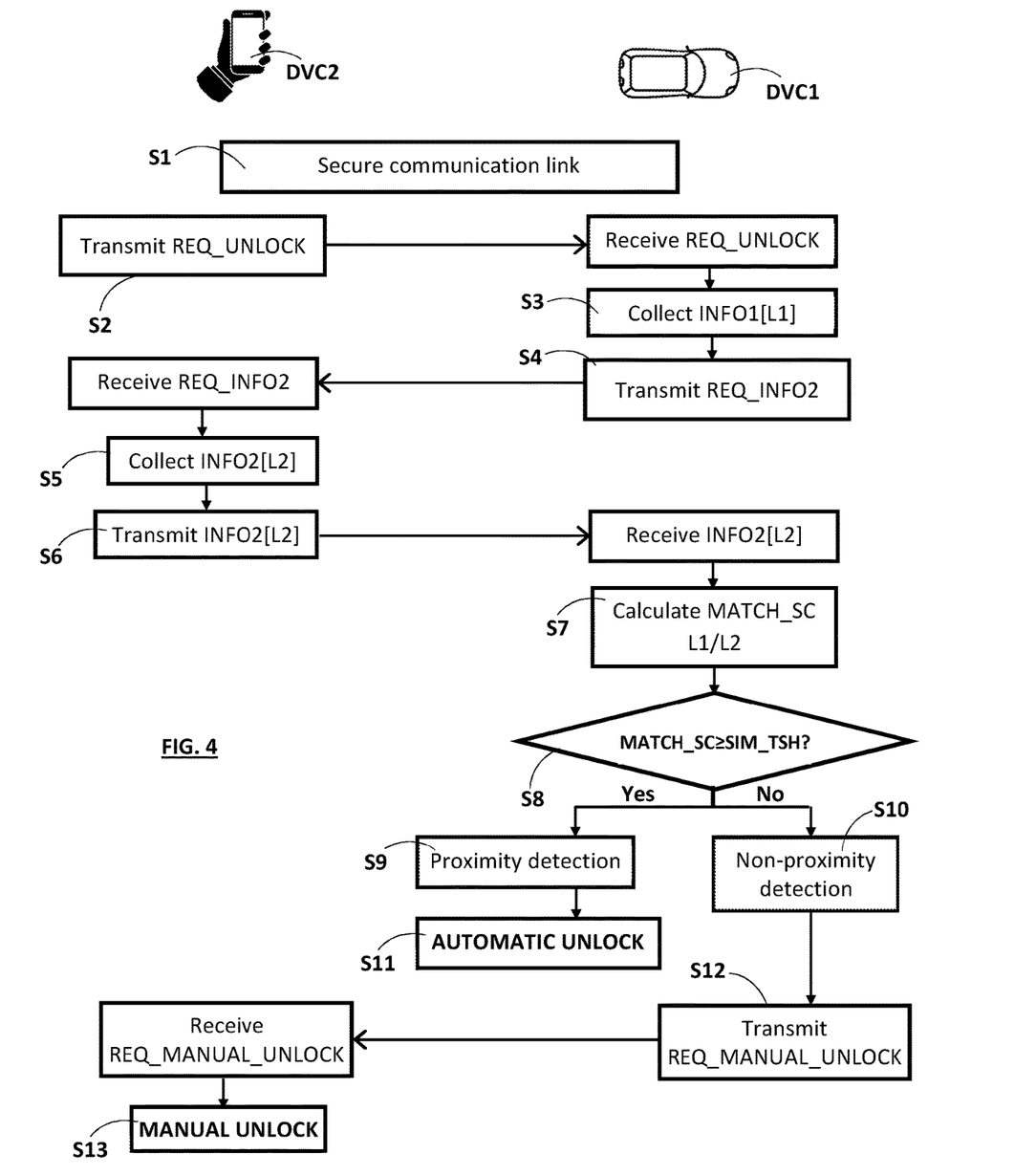
FIG. 4 is a flowchart of a method of detecting proximity between the first and second device, according to the first embodiment.

A method of detecting proximity between a first device DVC1 and a second device DVC2 according to a first embodiment will now be described with reference to FIG. 4.

For example, the first device DVC1 is a vehicle and the second device DVC2 is a smartphone. The detection of proximity can be initiated by any of the two devices DVC1, DVC2. For example, the second device DVC2 approaches the first device DVC1 and is sensed by the first device DVC1 that continuously monitors its radio short-range. Upon sensing the second device DVC2, the first device DVC1 can initiate a step S1 of establishing a communication link between the two devices DVC1, DVC2.

The communication established between the two devices DVC1, DVC2 in the step S1 is a short-range wireless communication, such as Bluetooth. It is optionally a secure communication, for example by encryption of the messages exchanged between the two devices DVC1, DVC2 with an encryption key k. This encryption key k is for example a secret (symmetric) cryptographic key shared by the two devices DVC1, DVC2 and pre-stored in both devices DVC1, DVC2 during a previous configuration step.

Once the communication link between the two devices DVC1 and DVC2 is established, the second device DVC2 automatically transmits a request REQ_UNLOCK for unlocking the first DVC1 through the communication link, in a step S2. The request REQ_UNLOCK is received by the first device DVC1.

Upon reception of the request for unlocking REQ_UN-LOCK, the first device DVC1 initiates the process of proximity detection in order to check whether or not the second device DVC2 is located in proximity to the first device DVC1.

In a step S3, the first device DVC1 collects a first information INFO1 on exposure of the first device DVC1 to electromagnetic waves. In the first embodiment, the first information on exposure INFO1 comprises a first list L1 of sources of electromagnetic waves $S_{11}$, $S_{12}$, . . . .

The first device DVC1 is likely to receive (in other words: to be exposed to) electromagnetic waves from one or more sources $S_{11}$, $S_{12}$, . . . .

The second device DVC2 is also likely to receive (in other words: to be exposed to) electromagnetic waves from one or more sources $S_{21}$, $S_{22}$, . . . .

The types of the wireless signals (in other words: electromagnetic waves) possibly received by each device DVC1, DVC2 depend on the environment of the device DVC1, DVC2. The sources of electromagnetic waves can be of different types such as Wi-Fi sources, Bluetooth sources, cellular network devices with antennas (e.g., base transceiver stations) or any other wireless communication device. The use of different types of wireless signals allows that the proximity detection is efficient in various types of environments.

In the first embodiment, the detection of proximity between the two devices DVC1 and DVC2 is based on the detection of radio waves (in other words: radio signals).

The first list of sources L1 can include names or identifiers of the sources $S_{11}$, $S_{12}$, . . . exposing the first device DVC1. In addition, the first list L1 can include, for each source $S_{11}$, $S_{12}$, . . . of the list L1, a first exposure level value $ELV_{11}$, $ELV_{12}$, . . . corresponding to a level of exposure of the first device DVC1 to said source $S_{11}$, $S_{12}$, . . . . The exposure level values $ELV_{11}$, $ELV_{12}$, . . . of the different sources $S_{11}$, $S_{12}$, . . . can be measured by one or more measuring instruments of the first device DVC1. They can be expressed in dBm (decibel-milliwatts), mW (milliwatts) or any appropriate unit of measure.

In a third step S4, the first device DVC1 transmits to the second device DVC2 a request REQ_INFO2 for collecting a second information INFO2 on exposure of the second device DVC2 to electromagnetic waves.

Upon reception of the request REQ_INFO2, the second device DVC2 collects the second information INFO2 on exposure of the second device DVC2 to electromagnetic waves, in a step S5. In the first embodiment, the second information on exposure INFO2 includes a second list L2 of sources of electromagnetic waves $S_{21}$, $S_{22}$, . . . with the names and/or identifiers of the sources $S_{21}$, $S_{22}$, . . . . In addition, the second list L2 can comprise, for each source $S_{21}$, $S_{22}$, . . . of the list L2, a second exposure level value $ELV_{21}$, $ELV_{22}$, . . . corresponding to a level of exposure of the second device DVC2 to said source $S_{21}$, $S_{22}$, . . . . The second exposure level values $ELV_{21}$, $ELV_{22}$, . . . can be measured by one or more measuring instruments of the second device DVC2.

Each of the two lists of sources L1, L2 can be limited to the N strongest sources $S_{11}$ to $S_{1N}$, $S_{21}$ to $S_{2N}$ (in other words: the N best detected sources). The number N can be limited to a value that is experimentally considered as relevant to evaluate the proximity between the two devices DVC1 and DVC2. For example, N can be an integer comprised between 5 and 15.

Optionally, in each list L1 (L2), the sources $S_{11}$, $S_{12}$, . . . ($S_{21}$, $S_{22}$ . . . ) is listed in order from the strongest source to the weakest source. The order of the sources is another characteristic of the exposure of the corresponding device DVC1 (DVC2).

Then, the second device DVC2 transmits the second information on exposure INFO2 (second list L2) to the first device DVC1, in a step S6. The second information INFO2 (in other words: the list L2) comprises the names or identifiers of the detected sources (optionally only the N strongest sources) and optionally the second exposure level value $ELV_{21}$, $ELV_{22}$, . . . . Optionally, the sources are listed in order from the strongest one to the weakest one.

The step S2 and the sequence of steps S4 to S6 can be executed in parallel and in any order. Preferably, collecting the first information on exposure INFO1 and collecting the second information on exposure INFO2 are performed concomitantly or substantially at the same time.

In a step S7, the first device DVC1 determines a matching information (in other words: a similarity information) between the first information on exposure INFO1 and the second information on exposure INFO2. The matching information can comprise a matching score MATCH_SC (in other words: a similarity score) between the first and second information on exposure INFO1 and INFO2. The matching or similarity score MATCH_SC represents a level of similarity between the first information on exposure INFO1 and the second information on exposure INFO2 (in other words: between the two lists L1, L2, here). The calculation of the matching score MATCH_SC takes into account similar observable characteristics between the exposure of the first device DVC1 to electromagnetic waves and the exposure of the second device DVC2 to electromagnetic waves, reflected by characteristics of two lists L1, L2. The characteristics of the two lists L1, L2 can include the names or identifiers of the sources, the order of the sources in each list L1, L2 and/or the exposure level values of the sources in each list L1, L2.

For example, the calculation S7 of the matching score MATCH_SC comprises determining a consistency information between the two lists of sources L1, L2 (i.e., between the two groups of source names or identifiers, possibly listed in order from the strongest one to the weakest one) and using the consistency information to determine the matching score MATCH_SC.

The consistency information can be a value, such as a percentage or an index, that reflects how the two lists L1, L2 are similar. In case that the two lists L1, L2 are identical because they contain the same sources in the same order, a value of 100% (or a predefined maximal index score) can be attributed to the consistency information. The consistency information can be determined based only on the N strongest sources of each list L1, L2.

Optionally, the calculation of the matching score MATCH_SC considers the exposure level values of sources present in the two lists L1, L2, in addition to the consistency information between the two lists L1, L2. If the two lists L1, L2 include common sources, listed in the same order from the strongest source to the weakest source, and the exposure level values of each common source in the two lists L1, L2 are identical or substantially identical (comparable), the matching or similarity score MATCH_SC calculated is attributed a percentage value of 100%.

In case that some differences are observed between the characteristics of the two lists L1, L2 (sources, order of the sources, exposure level values of the sources), the matching score is reduced accordingly, based on predefined rules that can be determined experimentally.

Different methods can be applied to calculate the matching score between the first information on exposure INFO1 and the second information on exposure INFO2. In all cases, the matching score MATCH_SC is calculated based on one or more observable characteristics of the exposure of each of the first and second device DVC1, DVC2 to electromagnetic waves (from sources), including part or all of the following characteristics: the sources of electromagnetic waves exposing the device DVC1, DVC2 (as seen or as detected by the device), the order of the sources from the strongest one to the weakest one as observed by the device DVC1, DVC2, the exposure level values of the device DVC1, DVC2 to the sources.

In a step S8, the matching score MATCH_SC calculated in the step S7 is compared to a predetermined similarity threshold SIM_TSH. The value of the similarity threshold SIM_TSH represents a level beyond which it can be considered that the exposure of the first device DVC1 to electromagnetic waves and the exposure of the second device DVC2 to electromagnetic waves are similar (in other words: identical or substantially identical). The matching or similarity score provides a level of confidence. In case that the matching score MATCH_SC is equal to or more than the similarity threshold SIM_TSH, the level of confidence that the two devices DVC1 and DVC2 are in proximity to each other is high. In case that the matching score MATCH_SC is less than the similarity threshold SIM_TSH, the level of confidence that the two devices DVC1, DVC2 are in proximity to each other is low.

In case that the matching score MATCH_SC is equal or above the similarity threshold SIM_TSH (branch 'Yes' in FIG. 4), the first device DVC1 determines that the two devices DVC1 and DVC2 are in proximity to each other, in a step S9 of proximity detection.

In case that the matching score MATCH_SC is below the similarity threshold SIM_TSH (branch 'No' in FIG. 4), the first device DVC1 determines that the two devices DVC1 and DVC2 are not in proximity to each other, in a step S10 (non-proximity detection).

After the positive detection of proximity in the step S9, the first device DVC1 is automatically unlocked in a step S11.

After detection of non-proximity between the two devices DVC1 and DVC2 in the step S10, the method proceeds with a step S12 of transmitting a request for executing a specific action. For example, the first device DVC1 transmits to the second device DVC2 a request for manually unlocking the first device DVC1. The manual unlocking can be performed by a user of the second device DVC2 in a step S13, for example:

by using a physical key suitable to unlock the first device DVC1, or by providing an unlocking code to the first device DVC1 via a user interface of the first or second device DVC1 or DVC2, or by pressing a button of a wireless key, or via an application of locking/unlocking, running on the first device DVC2, that displays an unlock button to be clicked on, on a screen of the second device DVC2.

In case of failure of the proximity detection, the automatic unlocking of the first device DVC1 is refused because the level of confidence is too low. However, a manual unlocking can still be used to unlock the first device. The manual unlocking allows to improve the security to unlock the first device DVC1.

Alternatively, when it is detected that the two devices DVC1 and DVC2 are not in proximity to each other, the request for unlocking the first device DVC1 could be simply refused (without specific request for another action like a manual unlocking).

In the present disclosure, in order to ensure that both devices DVC1, DVC2 are close, or in proximity, to each other, each device DVC1, DVC2 collects an exposure information on what it "sees" in its own radio environment. Each device DVC1, DVC2 captures a set of electromagnetic (radio) waves (in other words: a set of radio signals) from one or more sources and, for each of the sources, information on the source including a name and/or identifier, such as a network name, and optionally a strength level of the radio waves (radio signals) received from the source (in other words: a level of exposure to the source). This allows each device DVC1, DVC2 to generate a fingerprint, that can be termed as an image, of its radio environment. This fingerprint or image is represented by the information on exposure INFO1, INFO2. Then, the two fingerprints INFO1, INFO2 are compared. A certain range of tolerance between the two fingerprints INFO1, INFO2 is acceptable because the radio reception depends on many parameters such as the antenna efficiency of the receiving device DVC1, DVC2, how it is oriented, etc. The comparison between the two fingerprints INFO1, INFO2 provides a level of confidence. For example, if both devices DVC1, DVC2 see the same N strongest sources with levels of signal strength (in other words: levels of exposure to electromagnetic waves) that are equivalent or comparable (i.e., identical or substantially identical), it can be determined that the two devices DVC1, DVC2 are in proximity to each other. If the two lists L1, L2 of the N strongest sources seen by the two devices DVC1, DVC2 respectively are different and/or the levels of strength signals from the common sources are very different, it is highly probable that both devices DVC1, DVC2 are not in proximity to each other and non-proximity is detected.

Figure 1:
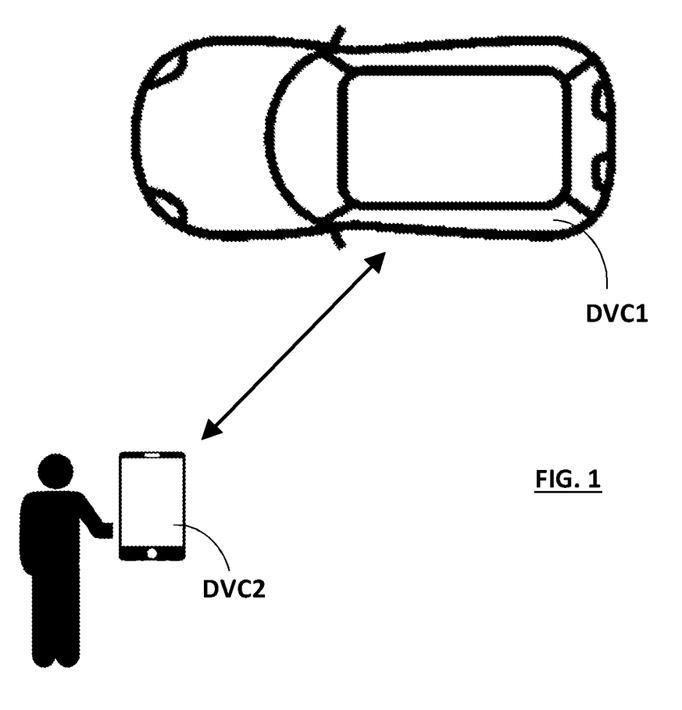
FIG. 1 shows a system including a first device (a vehicle) and a second device (a mobile user equipment).
Figure 2:
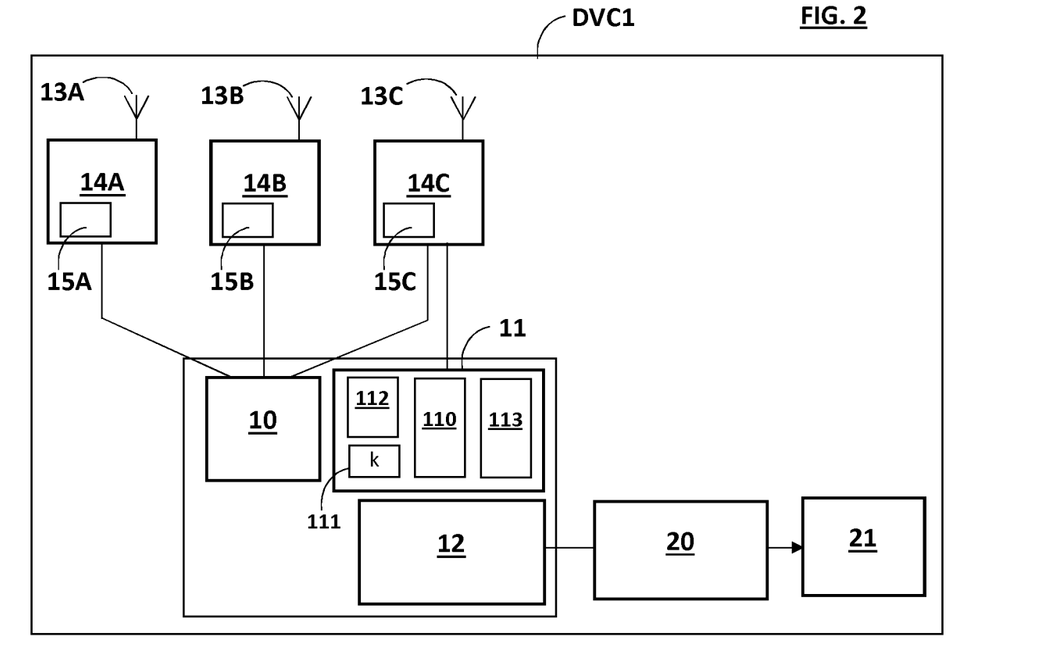
FIG. 2 shows a functional block diagram of the first device, according to a first embodiment.

A first embodiment of the first device DVC1 will now be described with reference to FIG. 2.

The first device DVC1 comprises a collector 10, a communication module 11 and a proximity detection module 12. In the present embodiment, the first device DVC1 comprises a controller 20 that controls the unlocking and locking of the DVC1 (e.g., the locking and unlocking of the vehicle's doors). For example, the controller 20 controls a system 21 for unlocking and locking the first device DVC1.

The collector 10 is configured to collect a first information INFO1 on exposure of the first device DVC1 to electromagnetic waves. The electromagnetic waves are received by one or more antennas of the first device DVC1. For example, the first device DVC1 has a first antenna 13A for receiving Wi-Fi signals, a second antenna 13B for receiving cellular network signals and a third antenna 13C for receiving Bluetooth signals. Any other configuration of antennas is possible. Each antenna 13A, 13B, 13C is connected to a corresponding wireless or radio receiver 14A, 14B, 14C that receives the electromagnetic (radio) waves and converts the information carried by them to a usable form. For example, the first device DVC1 comprises a Wi-Fi receiver 14A, a cellular network receiver 14B and a Bluetooth receiver 14C. Each radio receiver 14A, 14B, 14C can be provided with a signal strength meter 15A, 15B, 15C that is a measuring instrument that measures the strength of a signal received by the corresponding radio receiver 14A, 14B, 14C. In operation, the collector 10 collects from the radio receivers 14A, 14B, 14C of the first device DVC1 the following information related to electromagnetic (radio) waves received by the first device DVC1:

the names or identifiers of sources of the electromagnetic (radio) waves received by the first device DVC1;

optionally, the signal strength of each of the radio signals (in other words: the electromagnetic waves) received by the first device DVC1.

The collector 10 is configured to perform the step S3 of the method previously described.

The communication module 11 is configured to establish a communication with another device, for example the second device DVC2. A communication block 110 is provided for controlling the establishment of a communication and the exchange of messages with another device, for example the second device DVC2. In the present example, it is connected to the Bluetooth receiver 14C and is configured to establish Bluetooth communications. In other embodiments, any other type of radio short-range communication could be used to communicate with the second device DVC2.

In the present embodiment, the established communication between both devices DVC1 and DVC2 is secure, which means that the messages exchanged between both devices DVC1 and DVC2 are encrypted for example with a secret (symmetric) encryption key k shared by both devices DVC1, DVC2. The communication module 11 has a secure memory 111 storing the encryption key k and an encryption and decryption block 112 to perform encryption of the messages to be sent and decryption of the received messages.

The communication module 11 has a block 113 for obtaining a second information INFO2 on exposure of the second device DVC2 to electromagnetic waves, via the established communication. More precisely, once the communication between the two devices DVC1 and DVC2 established, the block 113 is configured to transmit a request to the second device DVC2 to receive the second information on exposure INFO2.

The communication module 11 is configured to perform the steps S1 and S4, of the method previously described.

The proximity detection module 12 is configured to determine a matching information, such as a matching score MATCH_SC, between the first information on exposure INFO1 and the second information on exposure INFO2, and to detect that the two devices DVC1 and DVC2 are in proximity to each other or in non-proximity to each other based on the matching information. The proximity detection module 12 is configured to perform the steps S7 to S10 of the method previously described.

The controller 20 is configured to control the automatic unlocking of the first device DVC1 in case of detection that the two devices DVC1, DVC2 are in proximity to each other. The controller 20 can also be configured to control the automatic locking of the first device DVC1 when the two devices DVC1, DVC2 are no longer in proximity to each other.

In case of detection that the two devices DVC1, DVC2 are not in proximity to each other, the controller 20 can also be configured to either request another action to the second device DVC2, such as a manual unlock action, or simply abort the unlocking.

The controller 20 is configured to perform the steps S11 to S13 of the method previously described.

Figure 3:
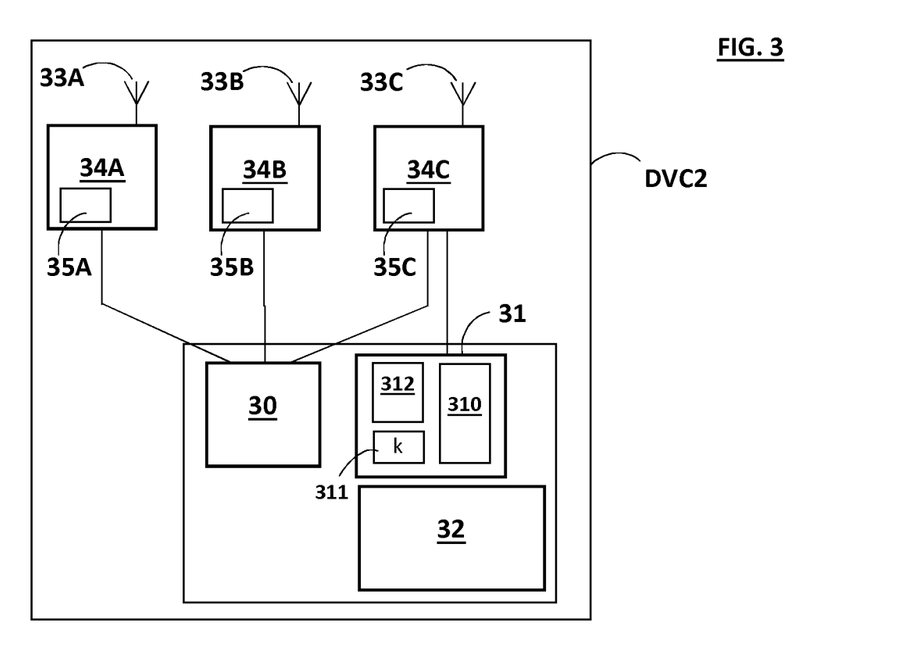
FIG. 3 shows a functional block diagram of the second device, according to a first embodiment.

A first embodiment of the second device DVC2 will now be described with reference to FIG. 3.

The second device DVC2 comprises a collector 30, a communication module 31 and a module 32 for unlocking the first device DVC1 and, optionally, for locking the module 32.

The collector 30 is configured to collect a second information INFO2 on exposure of the first device DVC2 to electromagnetic waves. The electromagnetic waves are received by one or more antennas of the first device DVC2. For example, the second device DVC2 has a first antenna 33A for receiving Wi-Fi signals, a second antenna 33B for receiving cellular network signals and a third antenna 33C for receiving Bluetooth signals. Any other configuration of antennas is possible. Each antenna 33A, 33B, 33C is connected to a corresponding wireless or radio receiver 34A, 34B, 34C that receives the electromagnetic (radio) waves and converts the information carried by them to a usable form. For example, the first device DVC1 comprises a Wi-Fi receiver 34A, a cellular network receiver 34B and a Bluetooth receiver 34C. Each radio receiver 34A, 34B, 34C can be provided with a signal strength meter 35A, 35B, 35C that is a measuring instrument that measures the strength of a signal received by the radio receiver. In operation, the collector 30 collects from the radio receivers 34A, 34B, 34C of the second device DVC2 the following information related to electromagnetic (radio) waves received by the second device DVC2:

the names or identifiers of sources of the electromagnetic (radio) waves received by the second device DVC2;

optionally, the signal strength of each of the radio signals (in other words: radio waves) received by the second device DVC2.

The collector 30 is configured to perform the step S5 of the method previously described.

The communication module 31 is configured to establish a communication with another device such as the first device DVC1. A communication block 310 is provided for controlling the establishment of a communication and the exchange of messages with another device, for example the first device DVC1. In the present example, it is connected to the Bluetooth receiver 34C and is configured to establish Bluetooth communications. In other embodiments, any other type of radio short-range communication could be used to communicate with the first device DVC1.

In the present embodiment, the communication established between the two devices DVC1, DVC2 being secure, the communication module 31 has a secure memory 311 storing the encryption key k and an encryption and decryption block 312 to perform encryption of the messages to be sent and decryption of the received messages.

The communication module 31 is configured to receive a request for a second information INFO2 on exposure of the second device DVC2 to electromagnetic waves, from the first device DVC1, and to transmit the requested second information on exposure INFO2 to the second device DVC2.

The communication module 31 is configured to perform the step S6 of the method previously described.

The module 32 for unlocking the first device DVC1 and, optionally, for locking the module 32 provides the second device DVC2 with the functionality of wirelessly unlocking the first device DVC1, and optionally wirelessly locking the first device DVC1. Unlocking and/or locking the first device DVC1 with the second device DVC2 can be performed automatically based on a proximity detection, or manually for example via a graphical user interface displaying unlock and/or lock buttons. The module 32 can comprise an application (in other words: a software component) for unlocking and locking the first device DVC1, that is installed and configured to run on a processor of the second device DVC2.

The present disclosure also concerns:

a first computer program comprising instructions which, when executed by a first computer (in other words: a first processor), cause the first computer (in other words: the first processor) to execute the method steps, previously disclosed, that are performed by the first device DVC1;

a second computer program comprising instructions which, when executed by a second computer (in other words: a second processor), cause the second computer (in other words: the second processor) to execute the method steps, previously disclosed, that are performed by the second device DVC2.

In the embodiments described, the detection of proximity between the two devices DVC1, DVC2 is used to automatically unlock the first device DVC1 with the second device DVC2. Alternatively, the detection of proximity could be used to execute any other action at the first device DVC1 and/or at the second device DVC2, when the two devices DVC1, DVC2 are detected in proximity to each other.

In other embodiments, in the detection of proximity between the two devices DVC1, DVC2, the first information INFO1 on exposure of the first device DVC1 and the second information INFO2 on exposure of the second device DVC2 could include information on any other type of electromagnetic radiations such as microwaves, infrared, ultraviolet, (visible) light, X-rays and/or gamma rays electromagnetic waves.

The invention claimed is:

1. A method of proximity detection between a first device and a second device, carried out by the first device, comprising:
   collecting a first information on exposure of the first device to electromagnetic waves, said first information including a first list of sources of electromagnetic waves exposing the first device;
   receiving a second information on exposure of the second device to electromagnetic waves from the second device, said second information including a second list of sources of electromagnetic waves exposing the second device;
   determining a consistency information between the two lists and using said consistency information to determine matching information between the first information on exposure and the second information on exposure; and
   detecting either proximity or non-proximity between the first device and the second device based on the matching information.

2. The method according to claim 1, wherein the first device calculates a matching score between the first information on exposure and the second information on exposure and, in case that the matching score is more than a predetermined threshold, the method detects proximity between the first device and the second device.

3. The method according to claim 1, wherein the consistency information is limited to the N strongest sources exposing the first device and to the N strongest sources exposing the second device, N being a predetermined and fixed number.

4. The method according to claim 3, wherein the first device:
   further measures first exposure level values, each first exposure level value corresponding to a level of exposure of the first device to each of the corresponding sources of electromagnetic waves;
   receives second exposure level values, each second exposure level value corresponding to a level of exposure of the second device to each of the corresponding sources of electromagnetic waves; and
   uses the first exposure level values and the second exposure level values in the determination of the matching information.

5. The method according to claim 1 wherein each of the first device and the second device collects information on exposure to electromagnetic waves from sources of the group including Wi-Fi sources, Bluetooth sources, a cellular network device and connected devices.

6. The method according to claim 1 wherein the first device establishes a secure communication with the second device and receives the second information on exposure from the second device via the secure communication.

7. The method according to claim 1 further comprising automatically executing a predefined action, at the first device, upon detection of proximity between the first device and the second device.

8. The method according to claim 7, wherein the predefined action includes automatically unlocking the first device.

9. The method according to claim 8, wherein the first device is a vehicle and the second device is a user mobile equipment.

10. A first device comprising:
    a collector configured to collect a first information on exposure of the first device to electromagnetic waves, said first information including a first list of sources of electromagnetic waves exposing the first device;
    a communication module configured to establish a communication with a second device;
    wherein the communication module is further configured to receive a second information on exposure of the second device to electromagnetic waves, via the established communication, said second information including a second list of sources of electromagnetic waves exposing the second device; and
    the first device further comprises a proximity detection module configured to determine a consistency information between the two lists and to use said consistency information to determine a matching information between the first information on exposure and the second information on exposure and detect either proximity or non-proximity between the first and the second device depending on the matching information.

11. The first device according to claim 10, further comprising at least one measuring instrument to measure first exposure level values, each first exposure level value corresponding to a level of exposure of the first device to each of the corresponding sources of electromagnetic waves;
    wherein the communication module is configured to receive second exposure level values, each second exposure level value corresponding to a level of exposure of the second device to each of the corresponding sources of electromagnetic waves; and
    wherein the proximity detection module is further configured to use the first exposure level values and the second exposure level values in the determination of the matching information.

12. A system including a first device according to claim 10 and a second device comprising
    a collector configured to collect a second information on exposure of the second device to electromagnetic waves, said second information including a second list of sources of electromagnetic waves exposing the second device;

a communication module configured to establish a communication with the first device
and transmit the second information on exposure, via the established communication.

13. A non-transitory computer readable medium that stores a computer program comprising instructions which, when executed by a first processor, cause the first processor to execute
collecting a first information on exposure of the first device to electromagnetic waves, said first information including a first list of sources of electromagnetic waves exposing the first device;
receiving a second information on exposure of the second device to electromagnetic waves from the second device;
determining a consistency information between the two lists and using said consistency information to determine matching information between the first information on exposure and the second information on exposure; and
detecting either proximity or non-proximity between the first device and the second device based on the matching information.

\* \* \* \* \*